March 9, 1965    H. KORNMAYER    3,172,149
DEVICE FOR THE INSERTION OF METAL PARTS IN PRESS MOLDS
Filed Nov. 26, 1962
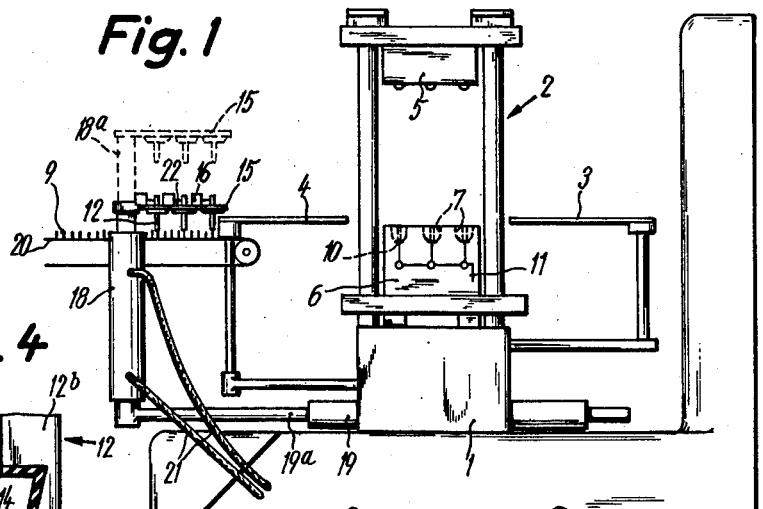
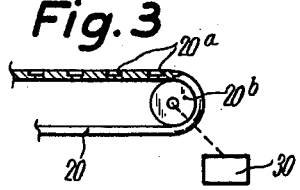
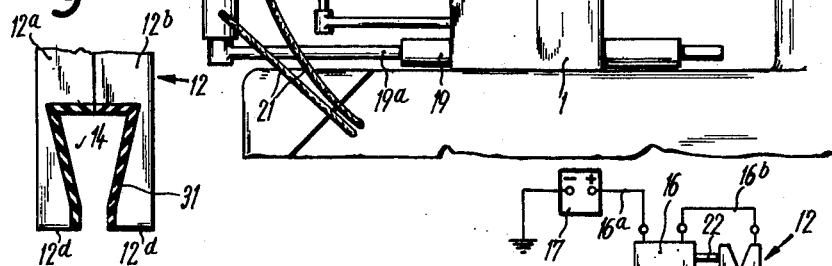
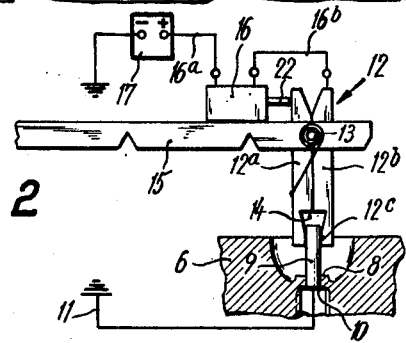
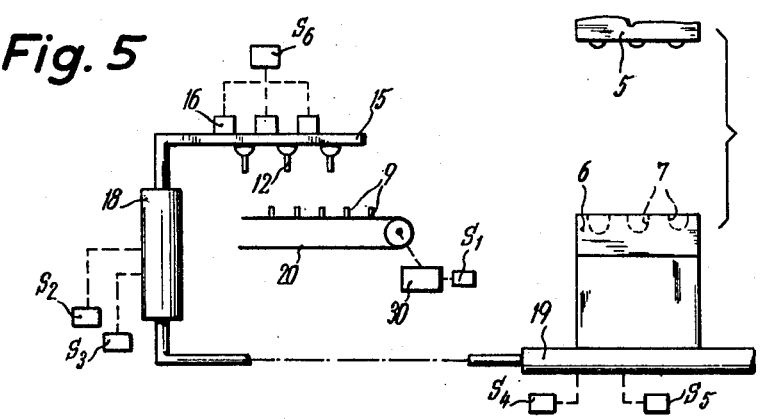
INVENTOR:
HORST KORNMAYER
By Werner W. Kleeman 3,172,149
DEVICE FOR THE INSERTION OF METAL
PARTS IN PRESS MOLDS
Horst Kornmayer, Gottmadingen, Kreis Konstanz, Germany, assignor to Maschinenfabrik Fahr A.G., Gottmadingen, Kreis Konstanz, Germany
Filed Nov. 26, 1962, Ser. No. 239,992
Claims priority, application Germany, Dec. 8, 1961,
M 51,124
6 Claims. (Cl. 18—1)

The present invention relates to an improved device for the insertion of metal parts in press molds of automatic pressing machines, presses and injection molding machines.

Heretofore, metal parts, such as for example screws, nuts, bushes and the like have been inserted in the press mold of plastic presses by hand. This work is both time-consuming and troublesome. In the case of automatic pressing machines, in particular, the machine capacity cannot even be approximately utilized to its fullest extent.

Accordingly, it is an important object of the present invention to provide an improved apparatus, whereby the insertion of metal parts which are to be embedded can be carried out automatically or semi-automatically.

The apparatus for inserting metal insert parts in press molds of pressing machines, presses and injection molding machines according to the present invention comprises a feeder or supply source for the metal insert parts, an insertion device including pivotable clamp members each engageable with a metal insert part and positioned to cooperate with said supply source. There is further provided at least one mold member or tool bottom part having mold cavity means for receiving said metal insert parts. Drive means are operatively connected with said insertion device for imparting a raising and lowering movement thereto as well as a horizontal movement between said supply source and said mold. The tool bottom part includes means cooperating with the metal inserts when received in the mold cavity means to cause the clamp means of the insertion device to move from a metal insert engaging position to a release position, whereby said metal insert is released and deposited into its associated mold cavity means.

Advantageously, the aforesaid means of the mold cooperating with the metal insert part may be a contact plate incorporated in the tool bottom part in each bottom mold, which contact plate closes a circuit through insert and clamp to an electromagnet, thereby opening the associated clamp. Expediently, the contact plate is set so deeply into an impression of the mold cavity that the circuit is only closed when the clamp has pressed the insert firmly into its seat. In a further embodiment of the invention the bore of the clamp may also be insulated, so that the circuit to the magnet is not completed until the end face of the clamp bears on the bottom mold impression connected to the contact plate.

According to the invention, the insertion device is longitudinally slidable in its frame. At the same time, the feed or supply device can be mounted below the insertion device. The supply device may be a conveyor belt having bores or apertures for receiving the inserts, which apertures are spaced to correspond to the distance between the clamps of the insertion device. Advantageously, for loading the clamps, the latter are lowered with the insertion device onto the conveyor belt, the clamps being opened by a contact, the inserts being pushed into the bore, and the clamps being closed again after interruption of the contact. The inserts, however, may be gripped so that they open the clamps slightly and the latter then hold the insert firmly.

A further object of the present invention is to provide an improved apparatus for inserting metal insert parts into press molds, which apparatus includes an insertion device provided with pivotable clamp members, and means cooperating with said insertion device to complete an electric circuit to cause each of said clamp members to release a previously clamped insert member when such has been seated in an associated cavity of the mold.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings wherein like reference numerals generally designate similar elements:

FIGURE 1 shows a side view of the device in an automatic pressing machine;

FIGURE 2 shows details of a clamp member with insert, of the device according to FIGURE 1 on a larger scale;

FIGURE 3 is a fragmentary view partly in section, on an enlarged scale, showing details of the conveyor means;

FIGURE 4 illustrates an enlarged fragmentary view of a modified form of clamp member; and FIGURE 5 schematically illustrates the device of FIGURE 1 provided with actuating switch means.

Referring now to the drawings and, more particularly, to FIGURES 1 and 2 thereof, it will be recognized that a press frame support 2 is mounted on a press base 1. A material feeder 3 and a material discharger 4 for the pressings are arranged so as to be horizontally slidable in the press base 1. In the embodiment depicted in FIGURE 1, the tool top part 5 and the tool bottom part 6 are shown in open position. Bottom molds or mold cavities 7 are advantageously machined in the tool bottom part or mold member 6 and each of these mold cavities is provided with an impression or contour portion 8 having an opening on its bottom face, defining a seat portion into which a metal insert 9 can be inserted. The lower space below the insert 9 when seated in the impression 8 is closed by a contact plate 10, to which a ground or earth lead 11 is connected.

FIGURE 2 shows in the inserted position an insert member 9 gripped by a clamp member 12 comprising two clamp halves 12a, 12b. The clamp member 12 is normally held closed by a spring member 13 or suitable equivalent. For receiving the insert 9, the clamp halves 12a, 12b of the clamp 12 are provided with an inwardly widening conical bore 14, so that the insert 9 is gripped only by the front, preferably flattened edges 12c of the clamp halves 12a, 12b. The clamp member 12 is mounted electrically insulated on an insert carrier plate 15, which may be equipped with a number of such clamp members 12. The insert carrier plate 15 and its clamp members 12 are the most important parts of the insertion device.

Each clamp 12 is provided with a magnet 16 associated with it, which is mounted on the insert carrier plate 15 and is merely diagrammatically illustrated. The magnet 16 is connected in the circuit of a battery 17 by conductor or lead line 16a. The clamp member 12 is also connected in the circuit by a lead line 16b, as clearly shown in FIGURE 2. As will more fully be explained hereinafter, the electric circuit to the magnet 16 is completed when the insert member 9 is seated on the contact plate 10 arranged below the impression or contour portion 8 at the bottom of the mold 7.

As will be seen from an inspection of FIGURE 1, the insert carrier plate 15 is mounted on a vertical piston arrangement 18*a* of a hydraulic cylinder 18, in turn attached to the end of a horizontal piston arrangement 19*a* of a hydraulic cylinder 19. The hydraulic cylinders 18, 19 are connected in known manner to suitable conduits, of which FIGURE 1 only shows the conduits 21 for the hydraulic cylinder 18. It will be appreciated that the members 18*a*, 18 and 19*a*, 19 define drive means for displacing the insert carrier plate 15 vertically and horizontally, depending upon operating requirements. Of course, as is evident, in place of the hydraulic drive shown, it would also be possible to employ suitable pneumatic or mechanical drive arrangements. It is to be understood then that the disclosed drive arrangement is only by way of illustration.

In the position of the insert carrier plate 15 shown in full lines in FIGURE 1, the clamp members 12 grip the insert members 9 which are transported below said clamp members by an intermittently moved transport or supply means, such as conveyor belt 20. In order to facilitate carrying of the insert members 9 by the conveyor belt 20 such may be provided with suitable bores or apertures 20*a* adapted to receive said insert members, in a manner best ascertained by reference to FIGURE 3. The bores or apertures 20*a* of the conveyor belt 20 may be advantageously spaced from one another a distance corresponding to the distance between the clamp members 12. A suitable drive motor 30 which may, if desired, be also manually controlled is operatively connected in driving relation to a suitable wheel member 20*b* or the like provided for the conveyor belt 20, in order to impart the required intermittent or stepwise movement to said conveyor belt.

As previously indicated, the arrangement of FIGURE 2 completes the circuit to the magnet 16, for reasons to be explained shortly, whenever the insert member 9 seats on contact plate 10. As an alternative arrangement, and as shown in FIGURE 4, it is possible to provide the bore 14 of the clamp members 12 with suitable insulation 31, so that the circuit to the magnet 16 is not completed until the end face 12*d* of the clamp member 12 bears on the bottom mold impression 8 connected with the contact member 10.

The mode of operation of the device which will now be described primarily in conjunction with FIGURES 1 and 4 is as follows: During the stepwise feed of the insert members 9 by the motor driven conveyor 20, the insert carrier plate 15 with its clamps 12 is in the position shown in phantom lines in FIGURE 1, or it moves into this position as soon as the material discharger 4 moves or has moved out of the pressing space. This control is effected by suitable stops or switch means with which the corresponding drives are automatically provided. When the insert carrier plate 15 with its clamp members 12 has reached the correct position above the insert members 9, the conveyor 20 is stopped and the downward movement of the insert carrier plate 15 is initiated. This also occurs by means of stops or microswitches. Thus, arresting of conveyor 20 may occur for example via the switch $S_1$, shown in FIGURE 5 in operable connection with the drive motor 30 for said conveyor 20, whereas raising and lowering of the insertion device 15 above the conveyor 20 may be carried out via switch means $S_2$ operable with hydraulic cylinder 18. The insert carrier plate 15 with the clamp members 12 and the inserts 9 gripped by the latter is then raised again, and finally is carried by the horizontally operating hydraulic cylinder 19, actuatable for example by switch means $S_4$, into the press above the tool part 6. By means of a further stop or microswitch such as switch $S_3$, the insert carrier plate 15 with clamp members 12 and inserts 9 is again lowered, the inserts 9 entering the impressions 8 associated therewith. When the insert member 9 comes into contact with the contact plate 10, the circuit of the associated or corresponding magnet 16 is closed and the downward movement of the insert carrier plate 15 is stopped. The magnet receives current because its circuit is closed by the ground lead 11. The magnet 16 is energized and presses by means of a push rod 22 (FIG. 2) against the left-hand movable clamp arm 12*a* of the clamp member 12, which then opens. In order to prevent with certainty breaking of the circuit on opening of the clamp member, an industrial small relay with self-holding contacts, known per se is provided, so that the magnet receives current until the holding circuit is broken by a microswitch (not shown). These switching means are known per se, so that detailed representation and description is unnecessary.

On being energized, the magnet 16 at the same time initiates the upward drive movement of the hydraulic cylinder 18. When the aforementioned microswitch has interrupted the holding circuit of the magnet 16, the left-hand arm of clamp 12 is released, so that the clamp can close. By means of further microswitch means such as switch means $S_5$, the hydraulic cylinder 19 is switched on or rendered operative, so that the insert carrier plate 15 with all its parts is brought out of the press again into the position shown in phantom lines in FIGURE 1. The bottom mold 6 can now be filled with pressing powder and the actual pressing operation with the application of heat can be carried out. This is followed by the usual further operations familiar to those skilled in the art.

On renewed downward movement of the insert carrier plate 15, the clamp members 12 grip further insert parts 9 brought up by the conveyor belt 20. At the same time, if desired, the magnets 16 may be so controlled via switch means $S_6$ as to open the clamps 12 for gripping the insert members 9. However, as previously stated, the inserts 9 may be gripped so that they open the clamps slightly and the latter then hold the insert firmly. As already mentioned, the clamp members 12 may also engage the insert parts 9 lower than shown. The impression 8 may also be used as contact points, provided the gripping edges 12*c* of the clamp members are insulated as previously described. The special contact plate 10 may then possibly be dispensed with.

Having thus described the present invention, what is desired to be secured by United States Letters Patent is:

1. Apparatus for inserting metal inserts in press molds of pressing machines, presses and injection molding machines comprising, in combination; a supply source for metal inserts, insertion means for engaging a desired number of said metal inserts cooperating with said supply source, a tool bottom part provided with mold cavity means for receiving said engaged metal inserts, drive means operatively connected with said insertion means for imparting a raising and lowering movement thereto as well as a horizontal movement between said supply source and said tool bottom part, said tool bottom part being provided with means cooperating with said metal inserts when received in said mold cavity means to cause said insertion means to move from a metal insert engaging position to a release position, whereby said metal insert is freed and deposited into said mold cavity means.

2. Apparatus for inserting metal inserts in press molds of pressing machines, presses and injection molding machines comprising, in combination; a supply source for metal inserts, insertion means for engaging a desired number of said metal inserts cooperating with said supply source, a tool bottom part provided with mold cavity means for receiving said engaged metal inserts, drive means operatively connected with said insertion means for imparting a raising and lowering movement thereto as well as a horizontal movement between said supply source and said tool bottom part, said tool bottom part being provided with means cooperating with said metal inserts when received in said mold cavity means to complete an electric circuit to cause said insertion means to move from a metal insert engaging position to a release position, whereby said metal insert is released and deposited into said mold cavity means.

3. Apparatus for inserting metal inserts in press molds of pressing machines, presses and injection molding machines comprising, in combination; a supply source for metal inserts, insertion means including clamp means for engaging a desired number of said metal inserts cooperating with said supply source, a tool bottom part provided with mold cavity means for receiving said engaged metal inserts, drive means operatively connected with said insertion means for imparting a raising and lowering movement thereto as well as a horizontal movement between said supply source and said tool bottom part, means cooperating with said drive means for lowering said insertion means in the direction of said tool bottom part when said respective clamp means together with an associated engaged metal insert are located in alignment with said mold cavity means for deposit of said metal insert therein, said tool bottom part including means cooperating with said metal inserts when received in said mold cavity means to cause said insertion means to move from a metal insert engaging position to a release position, whereby said metal insert is freed and deposited into said mold cavity means.

4. Apparatus for inserting metal inserts in press molds of pressing machines, presses and injection molding machines comprising, in combination; a supply source for metal inserts, insertion means including pivotal clamp means for engaging a desired number of said metal inserts cooperating with said supply source, a tool bottom part provided with mold cavity means for receiving said engaged metal inserts, drive means operatively connected with said insertion means for imparting a raising and lowering movement thereto as well as a horizontal movement between said supply source and said tool bottom part, means cooperating with said drive means for lowering said insertion means towards said tool bottom part when said respective pivotal clamp means together with an associated engaged metal insert are located in alignment with said mold cavity means for deposit of said metal insert therein, said tool bottom part including means cooperating with said metal inserts when received in said mold cavity means to complete an electric circuit to cause said insertion means to move from a metal insert engaging position to a release position, whereby said metal insert is released and deposited into said mold cavity means, said drive means thereafter returning said insertion means to said supply source.

5. Apparatus for inserting metal inserts in press molds of pressing machines, presses and injection molding machines according to claim 4; including means mounting said insertion device for horizontal sliding movement.

6. Apparatus for inserting metal inserts in molds comprising, in combination; a supply source for metal inserts, insertion means including a number of individual pivotable clamp members each adapted to engage a metal insert and disposed to cooperate with said supply source, a mold member provided with mold cavity means for receiving said metal insert parts, drive means operatively connected with said insertion device for imparting a raising and lowering movement thereto as well as a horizontal movement between said supply source and said mold member, switch means for actuating said drive means, said mold member including means cooperating with said metal inserts when received in said mold cavity means to cause said insertion means to move from a metal insert engaging position to a release position, whereby a metal insert is freed and deposited into its associated mold cavity means.

References Cited by the Examiner
UNITED STATES PATENTS

| | | | |
|---|---|---|---|
| 2,486,085 | 10/49 | Whitmore et al. | 214—1 |
| 2,870,938 | 1/59 | Sirles et al. | 221—294 |
| 2,881,575 | 4/59 | Day et al. | 53—59 |
| 2,927,679 | 3/60 | Rively | 214—1 |
| 2,963,141 | 12/60 | Pellow et al. | 214—1 |
| 3,075,651 | 1/63 | Kaden | 214—1 |

ALEXANDER H. BRODMERKEL, *Primary Examiner.*